April 24, 1928.
W. W. CARROLL ET AL
1,667,031
ROLLER FOR WINDOW CONTROL MECHANISM
Original Filed July 20, 1921
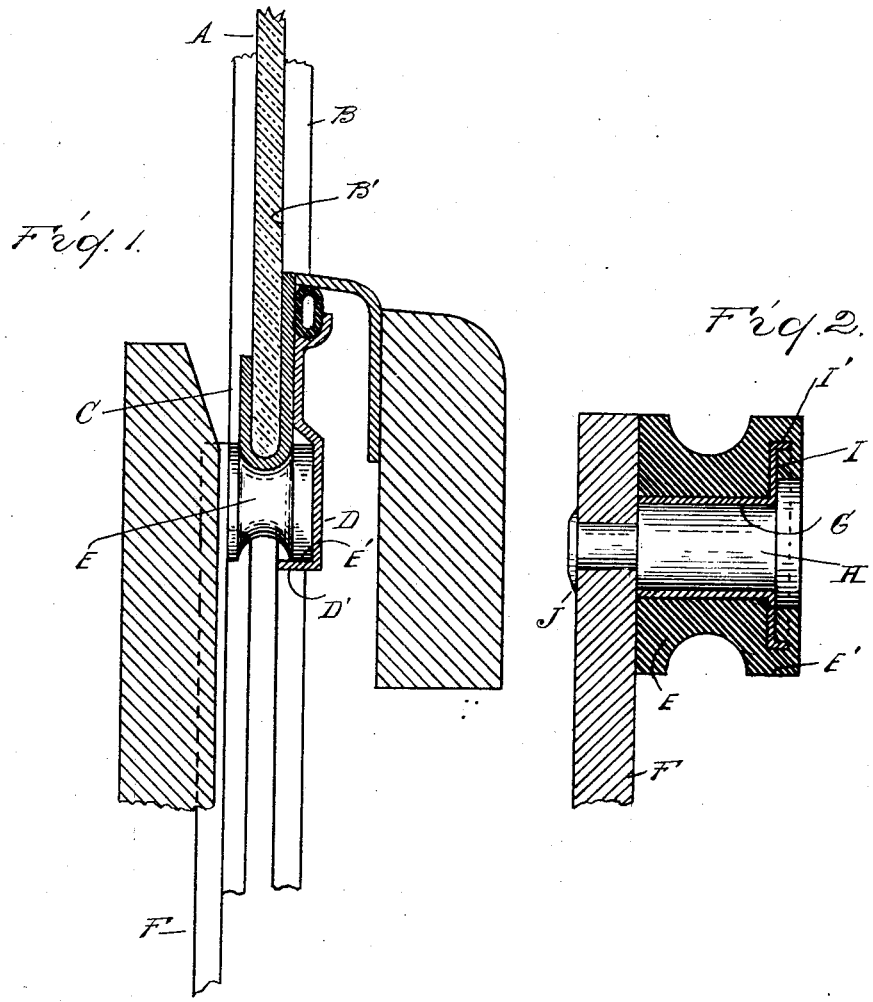
Wells W. Carroll and Stanley W. Nicholson Inventor
By Whittemore, Hulbert, Whittemore, and Belknap
Attorneys Patented Apr. 24, 1928.

1,667,031

UNITED STATES PATENT OFFICE.

WELLS W. CARROLL AND STANLEY W. NICHOLSON, OF TOLEDO, OHIO, ASSIGNORS TO THE DURA COMPANY, OF TOLEDO, OHIO, A CORPORATION OF DELAWARE.

ROLLER FOR WINDOW-CONTROL MECHANISM.

Application filed July 20, 1921, Serial No. 486,279. Renewed July 6, 1925.

This invention relates to rollers for window control mechanisms, and it is the object of the invention to provide a roller formed of resilient material, preferably rubber, that will secure a perfectly noiseless operation and act to cushion vibration, shocks or jars to which the mechanism may be subjected.

In the drawings:

Figure 1 is a view in sectional elevation of a vehicle window of the vertically slidable type showing a control arm engaged with said window by means of the improved roller;

Figure 2 is an axial sectional view of said roller.

In these views, the reference character A designates a vertically slidable window member consisting preferably of an unframed plate of glass, one of the slideways being indicated at B, said slideway being grooved as indicated at B' to engage a vertical edge of the glass. The bottom edge of the plate A is embraced by a sheet metal channel strip C, and a sheet metal runway D for the roller is secured to the strip C projecting downwardly therefrom. The roller which is indicated at E is journaled upon the upper end of a control arm F, and is formed with an annular groove in which the channel strip C is adapted to seat. When said roller is properly engaged beneath the glass plate A, a cylindrical side portion E' of said roller engages within the runway D, and a flange D' formed upon the lower edge of said runway projects beneath the cylindrical face E' of the roller, maintaining the described engagement of the roller with the channel C, and receiving the down thrust of the roller when the control arm F is being employed to lower the plate A. The roller E is formed of an elastic shock absorbing material, preferably rubber. To rotatably mount said roller upon the arm F a bushing G may be axially arranged within the roller to form a bearing rotatively engageable with a pin H rigidly secured to the arm F.

A roller formed as described of rubber or like material possesses numerous advantages in its application to a window control mechanism. Thus said roller absorbs shocks or vibration due to either relative vertical or lateral play between the roller and the channel C, or runway D, and prevents any resulting noise of clicking. Furthermore, said roller functions as a shock absorber to take up stresses resulting from lost motion in any portion of the control mechanism so far as regards transmission of said stresses to the plate A. By bushing the roller as described, undue friction between the same and the journal pin H is avoided.

To give said bushing retention with respect to the roller, it is preferred to flange one end of the bushing outwardly, as indicated at I, and to form a short cylindrical flange I' at the outer edge of the flange I, the flanges I and I' being embedded in the roller. The pin H is formed with a head J, set into the outer end of the roller as a thrust bearing.

What I claim as my invention is:

1. The combination with a sliding window member and a control arm for actuating said window member, of a shock absorbing element carried by said arm and engaged with said window member to operate the latter from the former.

2. The combination with a sliding window member, of a run-way secured to an edge portion of said window member and a roller having a portion engaged in said runway, said roller being adapted to alternatively bear in opposite directions upon said runway and window member to actuate said window member alternatively in opposite directions and said roller being formed of yieldable material to absorb the shock of its contact with said run-way and window member.

3. The combination with a sliding window member, of a run-way secured to an edge portion of said window member and having a flange spaced therefrom, and a roller formed of yieldable material and engaging in said run-way.

4. The combination of a sliding window, a control arm for actuating said window, and shock absorbing means for operating the window from the arm, including a runway member secured to the window and a transverse member secured to the arm, one of said members being resilient to absorb the shock of its contact with the other of said members.

In testimony whereof we affix our signatures.

WELLS W. CARROLL.
STANLEY W. NICHOLSON.